(12) United States Patent
Stephens et al.

(10) Patent No.: US 8,738,812 B2
(45) Date of Patent: May 27, 2014

(54) TRANSFER OF COMMANDS AND STORAGE DATA TO A DATA STORAGE DEVICE

(75) Inventors: Matthew Stephens, Abingdon (GB); Shigekatsu Tateno, Abingdon (GB)

(73) Assignee: PLX Technology, Inc., Sunnyvale, CA (US)

( * ) Notice: Subject to any disclaimer, the term of this patent is extended or adjusted under 35 U.S.C. 154(b) by 295 days.

(21) Appl. No.: 12/472,901

(22) Filed: May 27, 2009

(65) Prior Publication Data
US 2010/0306417 A1    Dec. 2, 2010

(51) Int. Cl.
*G06F 3/00*    (2006.01)

(52) U.S. Cl.
USPC .......................................................... 710/5

(58) Field of Classification Search
USPC .......................................................... 710/5
See application file for complete search history.

(56) References Cited

U.S. PATENT DOCUMENTS

| | | | |
|---|---|---|---|
| 5,680,567 A * | 10/1997 | Dent | 711/220 |
| 7,272,780 B2 * | 9/2007 | Abbott et al. | 715/203 |
| 7,526,593 B2 * | 4/2009 | Mandal et al. | 710/310 |
| 2003/0204548 A1 * | 10/2003 | Kendall et al. | 709/101 |

OTHER PUBLICATIONS

SanDisk White Paper "Longterm Data Endurancer (LDE) for Client SSD", SanDisk Part No. 80-11-01654, Oct. 31, 2008.

* cited by examiner

*Primary Examiner* — Henry Tsai
*Assistant Examiner* — Juanito Borromeo
(74) *Attorney, Agent, or Firm* — Beyer Law Group LLP

(57) ABSTRACT

A controller controls transfer of commands and storage data over a databus to a data storage device. The controller comprises a memory arranged to store a queue of commands prior to the commands being transferred over the databus. The controller identifies data access commands in the queue that specify the same type of data access and contiguous ranges of addresses. A concatenated data access command is transferred in place of so identified data access commands, the concatenated data access command specifying the same type of data access and the overall range of addresses. This improves the rate of data transfers.

18 Claims, 10 Drawing Sheets

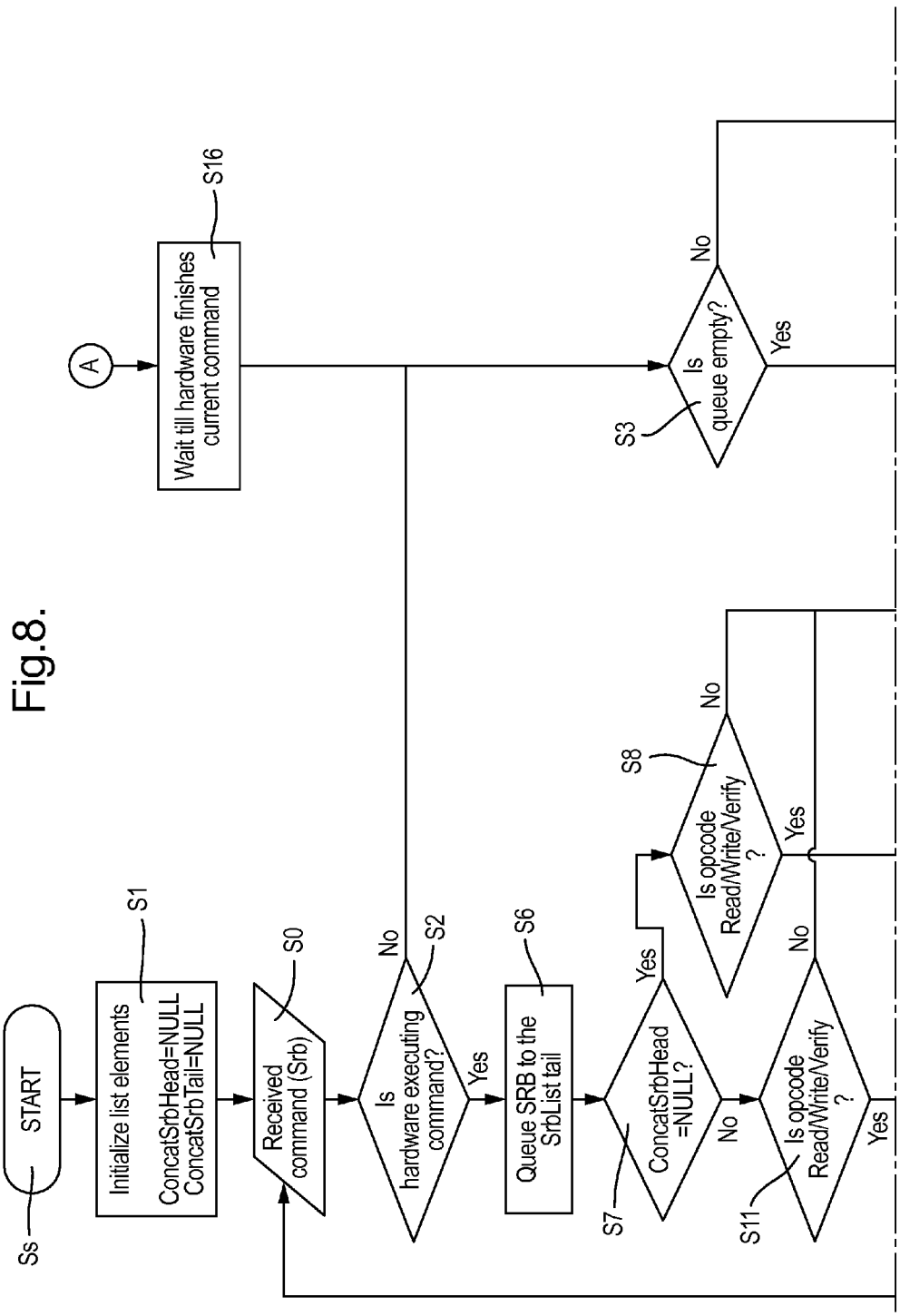

TRANSFER OF COMMANDS AND STORAGE DATA TO A DATA STORAGE DEVICE

BACKGROUND OF THE INVENTION (1) Field of the Invention

The present invention relates to the transfer of commands and storage data to a data storage device, for example over a databus, and is concerned with improving the rate of data transfers.

(2) Description of Related Art

Databuses are used to connect data storage devices with a host apparatus. Transfers of storage data, being the data of interest that is stored on the data storage device, occurs over the databus in either direction, that is from the host apparatus to the data storage device or vice versa. The transfers of storage data occur on the basis of commands that are transmitted from the host apparatus to the storage device. A wide range of types of databus are known. Typically, a standard specifies the nature of the databus, including the physical hardware of the databus and the data transfer protocol that specifies the format and timing of commands and storage data that are transferred. Examples of serial databuses include USB (Universal Serial Bus), SCSI (Small Computer System Interface), S-ATA (Serial Advanced Technology Attachment) and IEEE 1394. A controller is used to control the transfer of commands and storage data in accordance with the relevant standard.

An important performance parameter of a databus is the rate at which data is transferred. This will be dependent on the bandwidth of the databus and on the data transmission protocol. The transfer rate of individual bits of data is dependent on the bandwidth. The rate of transfer of storage data will be slower, additionally depending on the data transfer protocol which will impose an overhead on the transmission of storage data. It is desirable to maximise the rate of transfer of storage data and also the rate of transfer of commands. Standards are created with a view to this, whilst maintaining the reliability of data transfers.

Similar issues apply to transfers of data to a data storage device that is not over a databus.

BRIEF SUMMARY OF THE INVENTION

According to an aspect of the present invention, there is provided a controller for controlling transfer of commands and storage data to a data storage device, wherein the controller is arranged to transfer commands and storage data, the commands including data access commands specifying respective types of data access and a range of addresses, the controller comprising a memory arranged to store a queue of commands prior to the commands being transferred, and the controller is further arranged to identify data access commands in the queue that specify the same type of data access and contiguous ranges of addresses and, in response thereto, to transfer a concatenated data access command in place of the identified data access commands, the concatenated data access command specifying the same type of data access and the overall range of addresses specified by the identified data access commands.

According to a further aspect of the present invention, there is provided a controller for controlling transfer of commands and storage data that implements a similar method of controlling transfer.

Therefore, based on analysis of a queue of data access commands to be transferred, for example in a controller, the present invention provides for conversion of data access commands that specify the same type of data access and contiguous ranges of addresses into a single data access command that specifies the same type of data access and the overall range of addresses. Thus the new data access command is concatenated in the sense that the data access specified thereby is a concatenation of the data accesses specified by the original commands. In this manner, the transfer of the data access commands may be made more efficient. This benefit is achieved because there is an overhead associated with the handling of each individual command transferred from the queue. Thus by combining plural commands into a single command, a fewer number of commands is transferred with the result that the overall overhead is reduced. This improves the overall rate of transfer of storage data, without any change to the storage data being transferred. Similarly, the overall rate of transfer of commands is improved.

It has been appreciated that in practice consecutive data access commands commonly specify contiguous ranges of addresses. For example, one situation where this may occur is when the host apparatus accesses storage data sequentially but in relatively small chunks to maintain user responsiveness and minimise intermediate storage buffer requirements.

By way of example, the data access commands may specify respective types of data access including reading, writing and verifying of storage data. In each of these cases it is common in practice for a host apparatus to output a sequence of commands specifying contiguous ranges of addresses.

Commands to read and write storage data are data transfer commands causing transfer of storage data respectively to and from the storage device. In this case, by combining the data transfer commands, the overall overhead associated with a given amount of storage data is generally reduced, thereby improving the rate of transfer of the storage data. In this way, the performance of the transfer is improved.

Commands to verify storage data are data access commands that cause access to, and analysis of, storage data stored on the data storage device without that data being transferred. Nonetheless, by combining the data access commands, the number of commands is reduced, thereby improving the overall rate of transfer of the commands. In this way, the performance of the verification is improved.

The storage device has no knowledge of whether or not a received command is a concatenated data access command. Therefore on receipt of a concatenated data access command, the storage device processes it in the normal way and returns a response or status (for example a success or fail code etc.) in respect of the concatenated data access command. Thus the technique is transparent to the storage device which is advantageous because no modification of the storage device is required.

Advantageously, there may be stored a record of the identified data access commands that are replaced by a concatenated data access command and, in response to receiving a response to a concatenated data access command from a data storage device, there may be returned, for example to the host apparatus that originated the commands, separate responses to each of the identified data access command indicated in the record. In this way, the system downstream of the queue handles a single command, while upstream of the queue the behaviour is exactly the same as if no conversion took place. This manner of handling the combination of the commands is transparent to the host device and is advantageous because it allows implementation of technique without any modification to the host apparatus itself.

Typically, the data access commands include a start address and a length that specify said range of addresses. In this case, it is straightforward to generate the concatenated data access command specifying the overall range of addresses, by including a start address that is the start address of the first identified command and a length that is the total of the lengths of the identified commands.

The technique may be applied with particular advantage to the transfer of commands and storage data over a databus. In this case, the commands may originate from a host apparatus to enable the host apparatus to use the storage device for data storage in this case, the performance benefits are associated with the combined commands being more efficiently handled using the data transfer protocol of that databus.

Advantageously, the identifying of data access commands is performed while the databus is busy with the transfer of data thereof. In this manner, the analysis of the queue does not introduce any processing delay. Typically, if the databus is idle and able to accept commands immediately, commands may be normally passed through to the databus straightaway without concatenation, although in some cases there may be benefit in delaying (to possibly include this command in combination of any soon to follow commands).

An example of such a case is where the analysis of the queue also involves keeping a record of the history of previously processed groups of identified commands. In this case, the next command which is ready to be passed to the databus may be delayed as it is noted to be a data access to an address contiguous with one of a previously processed group of identified commands and therefore it is anticipated that it will be shortly followed by a sequence of one or more commands with data accesses to addresses contiguous to itself. The delay period will be limited to a length of time beyond which there would be no benefit gained by further delaying the command, even if a subsequent command were a data access to a contiguous address.

The technique is particularly applicable to a databus over which commands and storage data are transferred serially in time, including serial databuses and some parallel databuses. For example the transfer may occur in time-serial frames, commands and storage data being transferred in different frames. Examples of a databus to which the technique may be applied include a USB databus, a SCSI databus, an ATA databus (serial or parallel ATA) or an IEEE 1394 databus.

The technique may be applied in any controller that controls transfer of commands and storage data over a databus.

In one type of embodiment, the technique is implemented within the host apparatus, for example in a driver that acts as a controller for the databus, the data access commands being received from the operating system of the host apparatus. In the case of an internal storage device, the databus might for example be a SATA databus, or, where external storage is used, the databus might for example be a USB or IEEE 1394 databus.

In another type of embodiment, the technique is implemented within a bridge device for bridging from an upstream databus for connection to host apparatus to a downstream databus for connection to a data storage device, the bridge device receiving the data access commands from the host apparatus over the upstream databus and transferring them to the storage device over the downstream databus. In the case of externally attached storage, such a bridge device is used between an external databus (eg USB or 1394) and an internal databus (eg ATA or SATA). Indeed the technique may be implemented within a host apparatus and within a bridge circuit in the same system, therefore results in a better performance improvement than either used by itself.

The technique may also be applied to the transfer of commands and storage data within a system that does not include a databus. An example of such a system may be where a storage device is being emulated using a virtual device driver.

An embodiment of the present invention will now be described by way of non-limitative example with reference to the accompanying drawings.

DETAILED DESCRIPTION OF THE INVENTION

Figure 1:
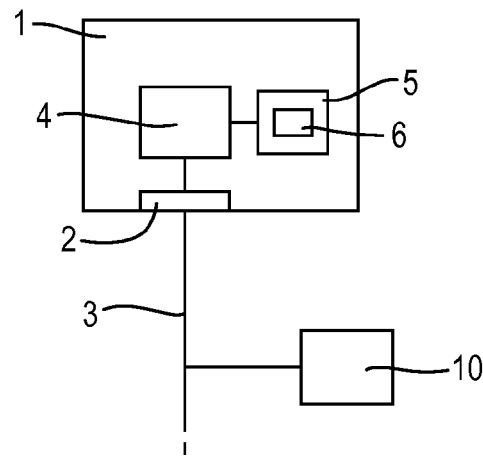
FIG. 1 is a diagram of an apparatus including a controller for a databus.

FIG. 1 illustrates a host apparatus 1 in which the present invention may be implemented. The host apparatus 1 has a physical interface 2 for connection to a databus 3 that allows the transfer of data thereover to a storage device 10 directly connected to the databus. The physical interface 2 and the databus 3 are both arranged in accordance with a relevant standard.

The host apparatus 1 further includes a controller 4 that controls the transfer of data over the databus 3, through the physical interface 2. The controller 4 is also arranged in accordance with the relevant standard. In particular, the controller 4 implements a data transfer protocol that specifies the format and timing of data, including commands and storage data, that are transferred.

The data transferred over the databus 3 to the storage device 10 may include storage data that is stored on the storage device 10, and other types of data such as commands.

The databus 3 may be a databus over which data such as commands and storage data is transferred serially in time. For example the databus 3 may be, for example a USB databus, a SCSI databus, an ATA databus (serial ATA or parallel ATA) or an IEEE 1394 databus. Typically in a databus of this type, the transfer of data occurs in time-serial frames. Commands and storage data may be transferred in different frames.

The commands may include data access commands that specify various types of access to the storage data stored on the storage device 10. Such data access commands may include data transfer commands that specify types of data transfer to or from the storage device, typically a read command that specifies reading of storage data from the storage device 10 or a write command that specifies writing of data to the storage device 10. The data access commands may also include commands that access the storage data stored in the storage device 10 without a transfer of storage data over the databus, for example a verify command that specifies performance of a process of verifying the storage data already stored in the storage device 10.

The controller 4 has a memory 5 which may be a dedicated memory or may be part of the memory of the host apparatus 1 as a whole. Under the control of the controller 4, the memory 5 stores a queue 6 of commands. The purpose of the queue 6 is to buffer the commands prior to their transfer over the databus 3 in case of commands being received at a higher rate than the databus 3 can accommodate.

The present invention is applied in the controller 4 which itself may be implemented in software or hardware. In some embodiments the controller 4 is implemented solely by software executed on a processor. In other embodiments, the controller 4 may include hardware components, typically themselves controlled by a control unit implemented by a processor running an appropriate routine.

The example of FIG. 1 relates to the case that the storage device 10 is connected directly to the databus 3. In this case, the storage device 10 might be a device located internally in the host apparatus 1 in which case the databus 3 is an internal databus of the host apparatus 1, for example a SATA databus. Alternatively, the storage device 10 might be an external device to the host apparatus 1 in which case the databus 3 is an external databus such as a USB databus or an IEEE 1394 databus.

Figure 2:
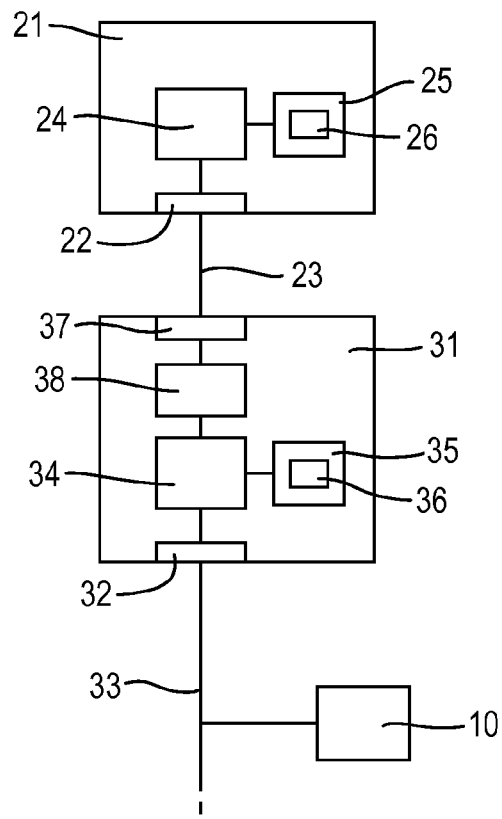
FIG. 2 is a diagram of a system including a host apparatus connected to a data storage device via two databuses and an intermediate bridge device.

FIG. 2 illustrates an alternative system in which the present invention may be implemented, comprising a host apparatus 21 connected to a storage device 10 by an upstream databus 23 and a downstream databus 33 which are interconnected by a bridge device 31. Thus the storage device 10 is directly connected to the downstream databus 33 and only indirectly connected to the upstream databus 23. The host apparatus 21 is a host apparatus 1 as illustrated in FIG. 1, in particular including an interface 22, a controller 24, a memory 25 storing a queue 26 which correspond to the equivalent components of the host apparatus 1 of FIG. 1, for connection to the upstream databus 23. Similarly, the bridge device 31 may include an interface 32 and a controller 34 having a memory 35 storing a queue 36 for connection to the downstream databus 33 which in operational terms correspond to the equivalent components in the host apparatus 1 of FIG. 1. In addition, the bridge device 31 concludes an upstream interface 37 and a controller 38 for connection to the upstream databus 23 in order to control the transfer over the upstream databus 23 within the data path between the databuses 23 and 33.

In this case, the upstream databus 23 might be external to the host apparatus 21, for example the upstream databus 23 being a USB databus or an IEEE 1394 databus, and the downstream databus 33 might be a databus that is internal to a storage apparatus housing the storage device 10, for example a SATA databus.

The present invention is applied in either or both of the controller 24 of the host apparatus 21 and the controller 34 of the bridge device 31, in the same manner as the controller 4 of the host apparatus 1 of FIG. 1, as described below. If the present invention is applied in both of the host apparatus 21 and the bridge device 31, then the improvement in performance is greater than if applied in either one of the host apparatus 21 or bridge device 31 alone.

In this system, the controllers 24 and 34 may in principle be implemented in software or hardware. Typically the controller 24 is implemented in part in software executed on the main processor of the host apparatus 21, for example in a driver for the upstream databus 23. Typically, the controller 34 of the bridge device 31 is implemented by hardware components for transfer of data and for control thereof by software executed on a processor of the host apparatus 21.

The operation of the host apparatus 1 will now be described, noting that the same operation may be performed in the host apparatus 21 and/or the bridge device 31.

During operation to receive commands and transfer them over the databus 3, the controller 4 performs an additional process of analysing the commands stored in the queue 6. In particular, the controller 4 identifies data access commands that specify the same type of data access and contiguous ranges of addresses. In response to this, the controller 4 generates and transfers over the databus 3 a concatenated data access command in place of the identified access commands. The concatenated data access command specifies the same type of data access and the overall range of addresses specified by the identified commands. In this manner, the concatenated data access command causes exactly the same data access of the same storage data in the storage device 10, but by using a single command and data phase rather than plural commands and data phases.

Figure 3:
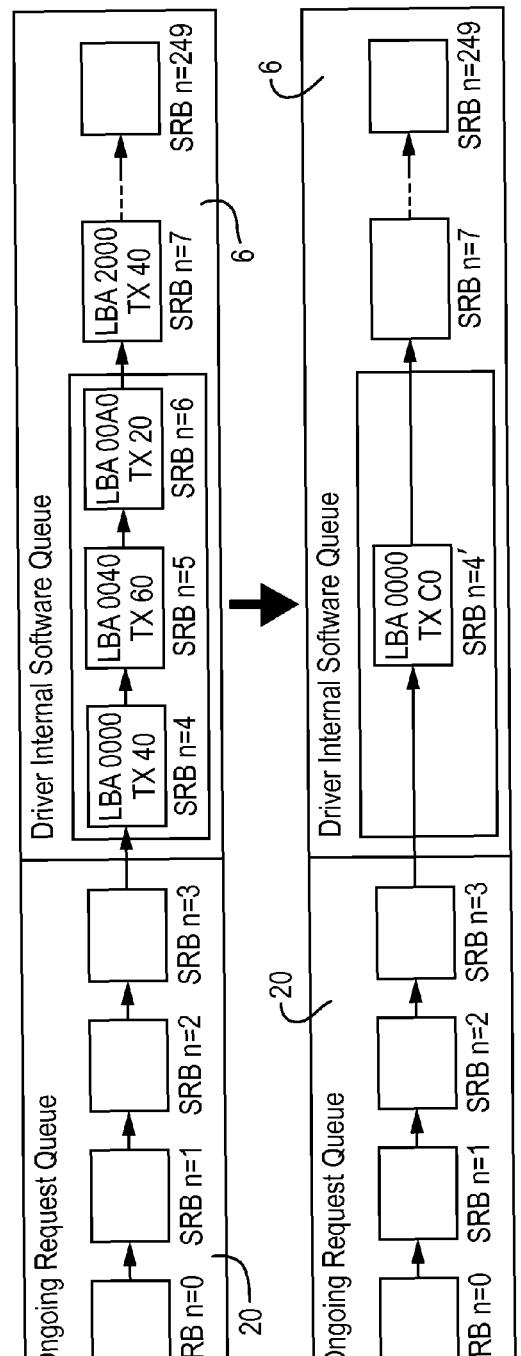
FIG. 3 is a schematic diagram of the processing of a pipeline of queued commands using concatenation.

As an example of this, FIG. 3 illustrates an example of such processing applied to the case of the databus 3 being a USB databus, wherein a pipeline 20 of 250 commands, each contained in a respective SRBs (SCSI Request Blocks) labelled by the number n pass through the queue 6 of the controller 4. Each command specifies the type of data access. Each command also specifies a range of addresses by specifying the start address of the range as an LBA (Logical Block Address) and the length of the range as a TX (Transfer). In this example three SRBs n=4, 5, 6 specify the same type of data access and specify ranges of addresses which are contiguous, that is:

$$(LBA \text{ of } n=5)=(LBA \text{ of } n=4)+(TX \text{ of } 4), \text{ i.e.}$$
$$0040=0000+0040$$

$$(LBA \text{ of } n=6)=(LBA \text{ of } n=5)+(TX \text{ of } 5), \text{ i.e.}$$
$$00A0=0040+0060$$

The following SRB n=7 does not specify a contiguous range of addresses because its LBA of 2000 is not contiguous with the end of the range of addresses specified by SRB n=6 that is equal to 00A0+20 (00C0).

Thus, as shown in FIG. 3 the three SRBs n=4, 5, 6 specifying a contiguous range of addresses are replaced by an SRB n=4' that contains a concatenated data access command of the same type specifying the overall range of addresses, in particular by including a start address that is the start address of the first identified command SRB n=4 (i.e. LBA 0000) and a length that is equal to the total of the lengths of the identified command (i.e. TX=40+60+20=C0)

In this manner, the concatenated command specifies the same data access, but the number of commands transferred over the databus 3 is reduced. This improves the efficiency of the transfer of the data access commands. The rate of transfer of storage data and indeed the rate of transfer of the commands themselves may be increased overall. The transfer rate of storage data is improved because there is an overhead or delay associated with the handling of each individual command. Thus, reducing the number of commands whilst transferring the same storage data means that this overhead is encountered in respect of only a single command, so the overall overhead is reduced. The benefit is particularly strong because in practice it is common for data access commands to specify contiguous range of addresses. For example, a host apparatus commonly accesses an extended range of contiguous addresses using plural commands, for a variety of reasons. Thus the benefit is commonly achieved.

Figure 4:
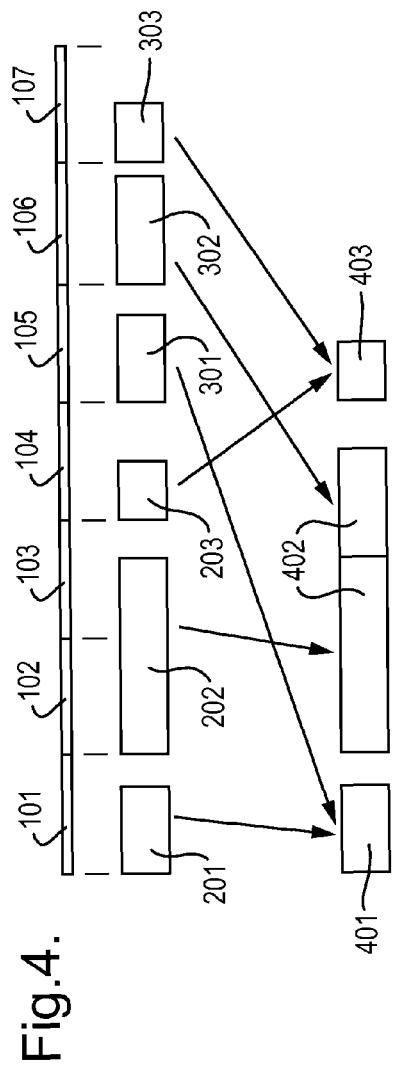
FIG. 4 is a timeline showing two data transfers commands being combined into a single data transfer with command.

To illustrate this benefit, FIG. 4 illustrates a simple example of combining two commands, 201 and 301, which have been identified as having the same type of data access and contiguous ranges of addresses. The commands 201 and 301 are replaced by a single command, 401, which specifies the same data access with the overall range of addresses. The data packets associated with the commands, 202 and 302, are sent as a concatenated data packet 402. The status packets 203 and 303 returned are replaced by a single status packet 403. When the packets are sent using frame structured timing, in frames 101, 102, . . . , 107, then the benefit can be seen as achieving the same data transfer in five frames instead of seven, resulting in a faster overall data transfer. With three or more commands, a further saving of two frames for every additional command will be achieved.

Figure 5:
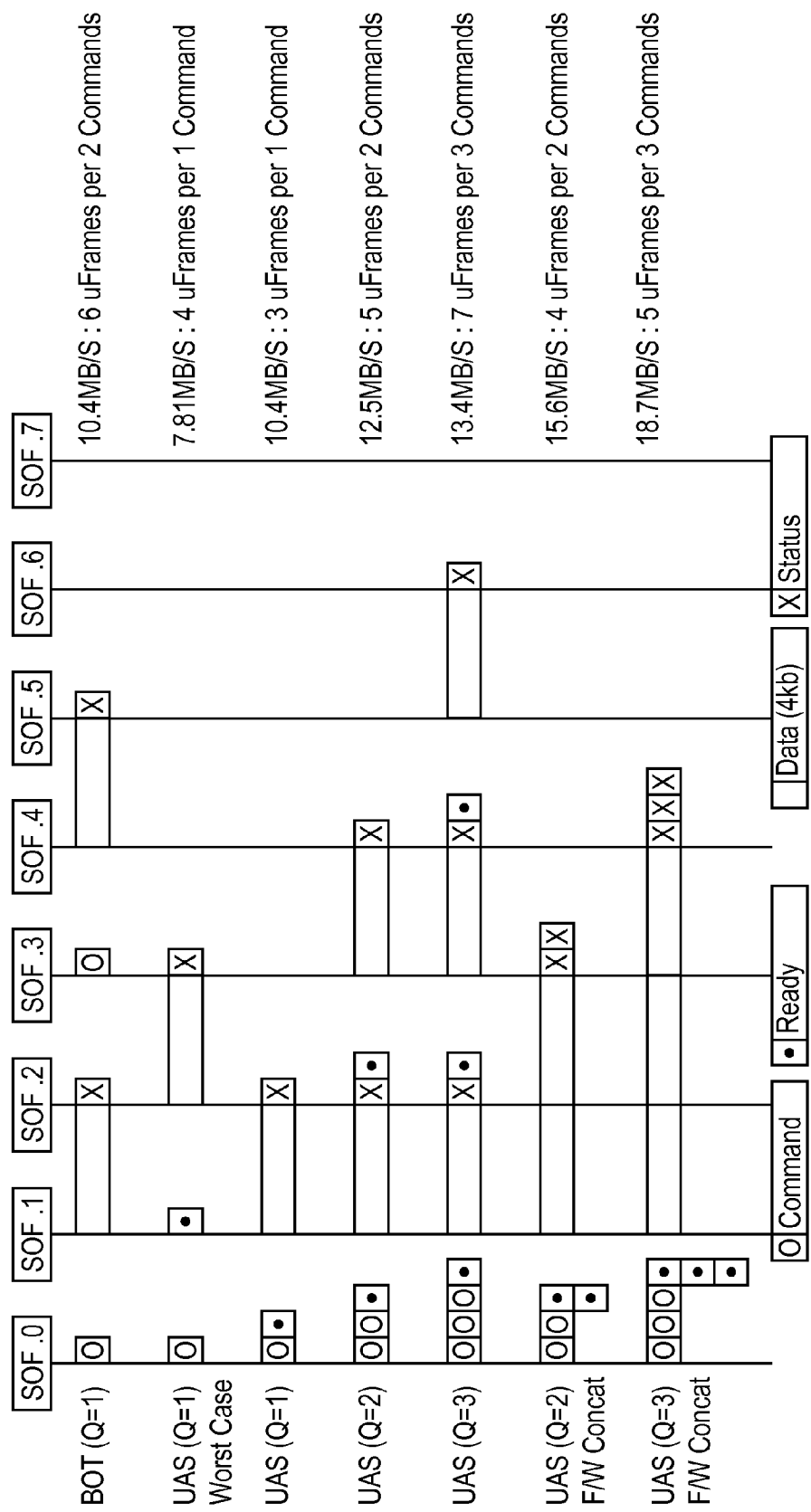
FIG. 5 is a timeline of different types of data transfer over a USB 2.0 bus.

To further illustrate this benefit, FIG. 5 shows a timing chart for the transfer of data transfer commands over a USB 2.0 bus for various different types of transfer protocol. In this case, all transfers take place within frames known as microframes or uFrames of duration 125 μs, the start of each frame (Start of Frame, SOF) being shown in FIG. 5 by vertical lines. Each command takes place in several phases illustrated at their respective timings by different blocks in FIG. 5.

In the case of USB 2.0, the current protocol is Bulk Only Transfer (BOT) which takes place in 3 phases: command (an instruction from a host apparatus to a storage device), data (transfer of storage data) and status (a response from the storage device back to the host apparatus). The top line of FIG. 5 shows a USB 2.0 BOT transfer of 8 kB. The maximum amount of storage data a single uFrame can support is 6.5 kB (13×512 Bytes), so this transfer takes place as two separate BOT cycles, each consisting of the 3 phases. The command, data and status phases each occupy a separate uFrame, so the command and status phases represent a significant overhead on the transfer of the storage data in the data phase. 6 uFrames are required to transfer 8 kB, corresponding to a rate of transfer of the storage data of approximately 10.4 MB/s.

In a proposed improvement to BOT called UAS (USB Attached SCSI), the protocol is modified to include a Ready phase, with separation of data phases from command or status phases. In the worst case illustrated in the second line of FIG. 5, each phase occupies a uFrame, with the result that a 4 kB transfers in 4 uFrames at a rate of 7.81 MB/s. For increased speed, the ready phase may be in the same uFrame as a command or status phase. This case is illustrated in the third to fifth lines of FIG. 5 respectively for transmission of 4 kB in three uFrames at a rate of 10.4 MB/s, the same as BOT, of 8 kB in three uFrames at a quicker rate of 12.5 MB/s, and of 12 kB in three uFrames at a still quicker rate of 13.4 MB/s.

However the final 2 lines of FIG. 5 show UAS with concatenation of commands in accordance with the invention, in this example in the controller of a bridge device. In the respective examples 2 and 3 commands have been received over an upstream USB databus in uFrame 0, but a single concatenated command is transferred over a downstream SATA databus 3 to a storage device 10. The storage device 10 responds with 2 or 3 Readys immediately, with the result that the data phases of the 2 or 3 commands take place back to back over the USB bus. The single status phase received over the SATA databus 3 is split into 3 status phases which are returned over the USB databus. The net result is that storage data of 8 kB or 12 KB is transferred in 4 uFrames or 5 uFrames at rates of 15.6 and 18.7 MB/s respectively.

These examples illustrate how an increase in the rates of transfer of storage data is achieved in the case of USB 2.0. In particular, there are demonstrated improvements of the order of 25% by concatenation of two commands and 40% by concatenation of three commands. This feature works independently of any concatenation being done in the host apparatus 21 (and hence will work with any device driver).

Figure 6:
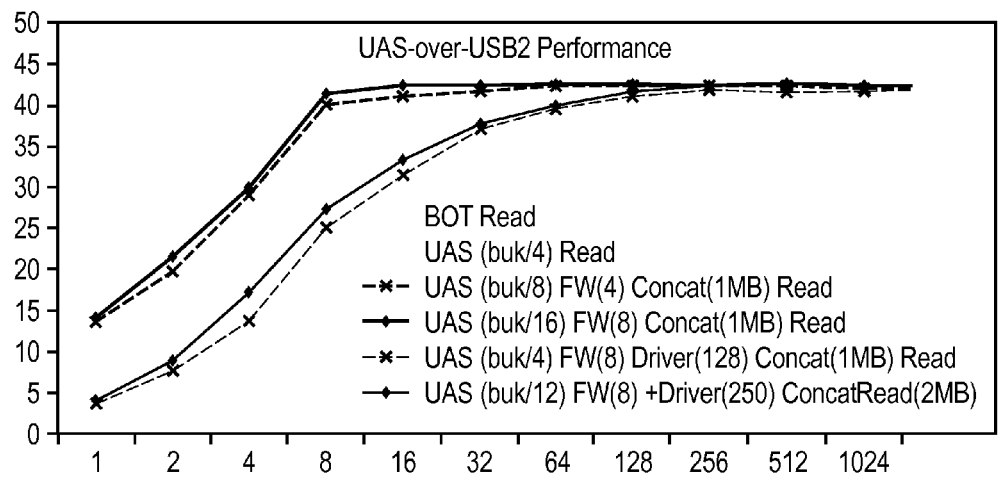
FIG. 6 is a graph of data transfer rate against block size for different types of data transfer over a USB 2.0 bus.

More generally, the performance results or prototype code to be implemented in a host apparatus 21 and a bridge device 31 have been simulated for UAS over USB 2.0 using a Windows disk performance benchmark application. These results are illustrated in FIG. 6 which is a graph of the transfer rate (MB/s) of storage data transferred using a read command against the block size (kB). The graph includes USB 2.0 BOT and UAS without concatenation, as comparisons. The remaining plots show data transfers with different levels of concatenation as identified in the legend to the graph, the figures shown in brackets being the number of commands queued before concatenation starts, the maximum number of concatenated commands performed in the bridge device 31, the maximum number of commands concatenated in the host apparatus 21 and the maximum concatenated data transfer size. The graphs illustrate how the concatenated commands are capable of improving the transfer rate over that of a BOT transfer for all block sizes, and over that of a normal UAS transfer albeit with a decreasing benefit as the block size increases.

While the examples relate specifically to USB-attached external disk drives, such concatenation is applicable generally to serial databuses for disk drive systems with similar input/output queuing architectures.

In the case of data access commands that do not involve the transfer of storage data over the databus 3, for example a verify command, then the concatenation reduces the number of commands transferred over the databus 3. This generally increases the overall rate of transfer of the commands, although the effect is less significant than in respect of the transfer of storage data.

There will now be described a specific implementation of the host apparatus 21 of FIG. 2, it being noted that the host apparatus 1 of FIG. 1 may be implemented in the same manner.

Figure 7:
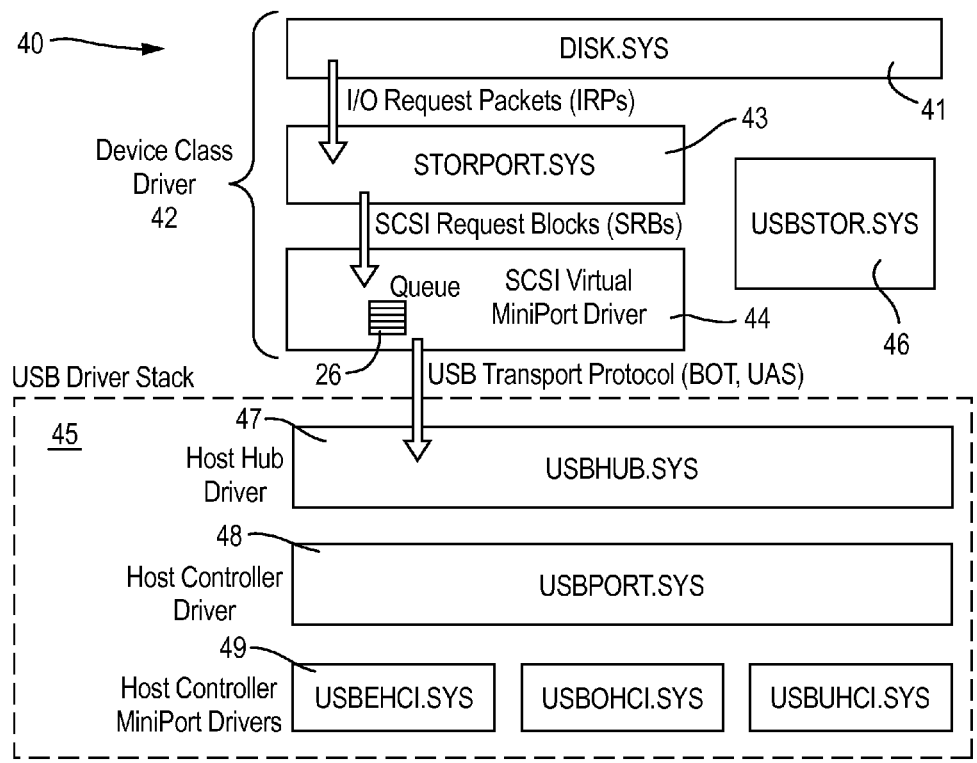
FIG. 7 is a diagram of the architecture of a controller in a host apparatus.

In this implementation, the controller 24 is implemented by software operating on the main processor of the host apparatus 21 within the Windows operating system. In particular, the controller is implemented by a software driver stack 40 for the processing of disk commands, as shown in FIG. 7. As the top most layer not shown in FIG. 7, an I/O Request to read or write data to/from a storage device 10 flows from a filesystem driver, NTFS.SYS, through a volume manager driver, VOLMGR.SYS through a partition manager driver, PARTMGR.SYS, to the disk device driver 41, DISK.SYS, that is shown in FIG. 7. The disk device driver 41, DISK.SYS, forms part of a Device Class Driver 42 comprising layers as follows. The disk device driver 41, DISK.SYS, directs I/O Request Packets (IRPs), which contains pointers to SCSI Request Blocks (SRBs), to the appropriate storage port driver for the disk in question, being in the case of a disk drive attached through USB or 1394, the Storport driver 43, STORPORT. SYS. This unwraps the IRPs to obtain the SRBs, which are passed to the SCSI Virtual MiniPort driver 44. This SCSI Virtual MiniPort driver 44 contains the queue 26 in which the SRBs are stored while waiting for the databus 23 to become free so the SRBs can be passed through a USB Driver Stack 45.

This present invention is applied to the processing of the SRBs in the queue 26 which is formed within the SCSI Virtual MiniPort driver 44, requiring the SCSI Virtual MiniPort driver 44 to be written specially for this purpose. In the prior art, a general purpose USB Storage class driver 46 (i.e. lacking any SRB processing of the kind discussed here), USBSTOR.SYS, is used to support external USB mass storage devices.

When the databus 23 is free, the SRBs are supplied to the databus 23 through the USB Driver Stack 45 which consists of a Host Hub Driver 47, USBHUB.SYS, a Host Controller Driver 48, USBPORT.SYS, and Host Controller MiniPort Drivers 49, USBEHCI.SYS, USBOHCI.SYS and USBUHCI.SYS.

Figure 8:
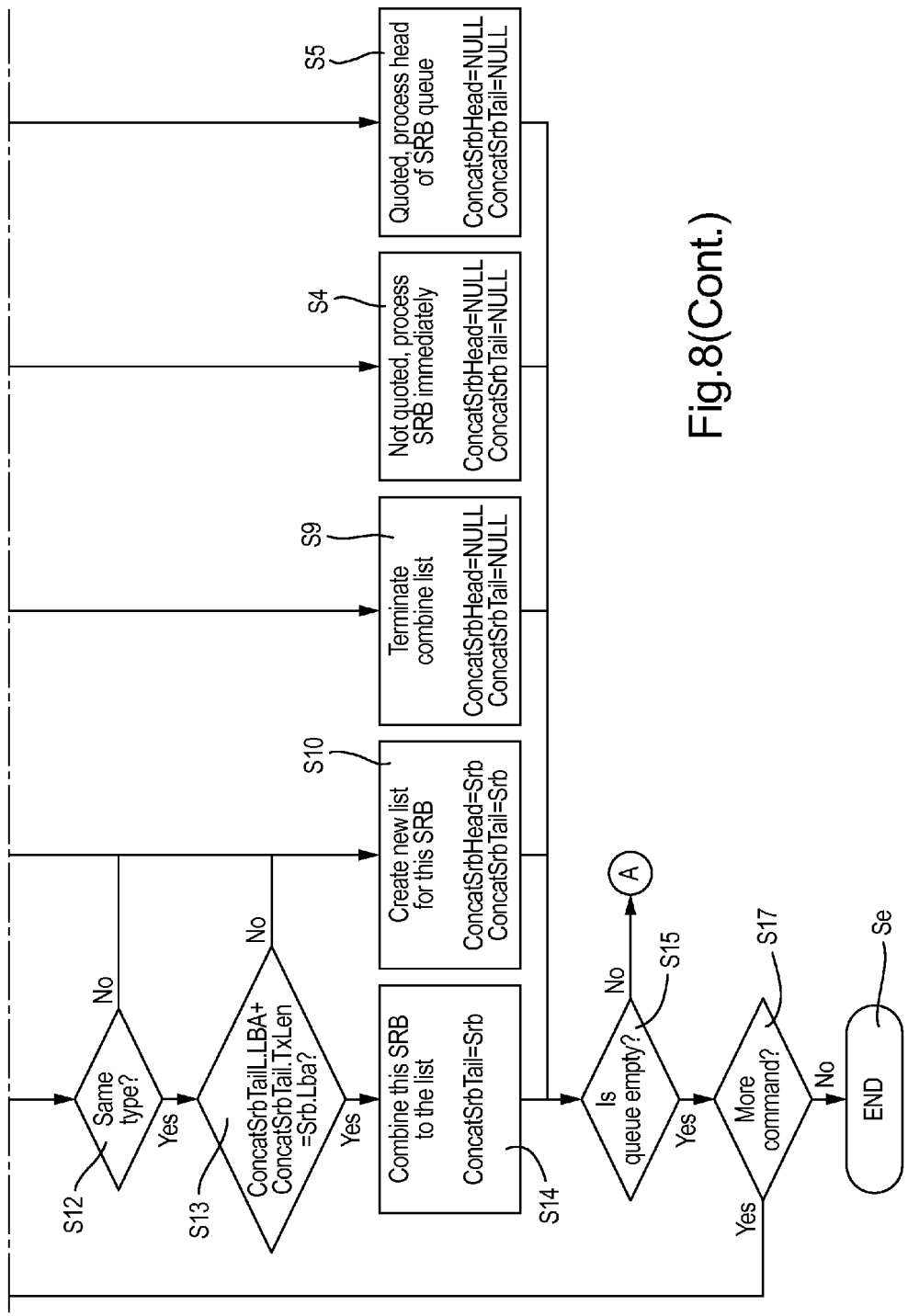
FIG. 8 is a flowchart of the processing performed in a controller.

The processing of the SRBs in the queue 26 is illustrated in FIG. 8 which is a flowchart from the start Ss of the process to the end Se of the process performed when a new SRB is received.

The process uses process pointers ConcatSrbHead and ConcatSrbTail that can each have values NULL or a pointer to an SRB, either both being a pointer to the preceding SRB or else being pointers to the head and tail of a preceding group of SRBs that have so far been identified for concatenation.

Figure 9:
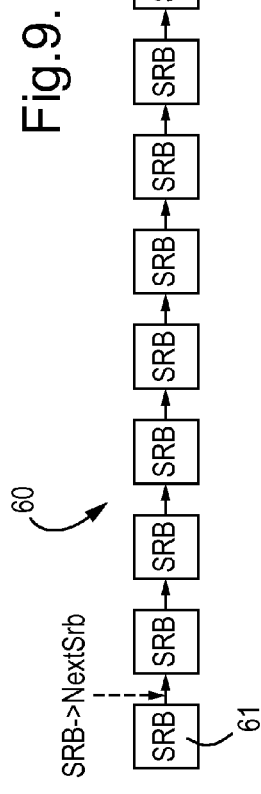
FIG. 9 is a diagram of a pipeline of SRB commands.
Figure 10:
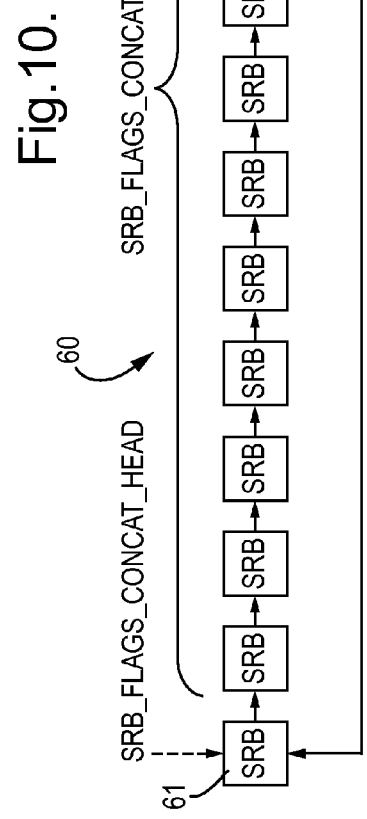
FIG. 10 is a diagram of the pipeline of FIG. 9 showing the marking to record concatenated commands.

The process is used to set SRB flags in respect of SRBs that identify for concatenation groups of two or more SRBs containing data access commands specifying data accesses of the same type and contiguous ranges of addresses. The SRB flags are as follows. The SRB at the head of a group of SRBs to be concatenated has its SRB flag set to the value SRB_FLAGS_CONCAT_HEAD. The SRB at the tail of a group of SRBs to be concatenated has its SRB flag set to the value SRB_FLAGS_CONCAT_TAIL. Any intermediate SRBs in a group of SRBs to be concatenated has its SRB flag set to the value SRB_FLAGS_CONCAT_DATA (not present in a group of only two SRBs). As an example, FIG. 9 illustrates a group 60 of 15 SRBs that contain commands to be concatenated and FIG. 10 illustrates that the SRB 61 at the head of the group 60 has its SRB flag set to the value SRB_FLAGS_CONCAT_HEAD, the SRB 62 at the tail of the group 60 has its SRB flag set to the value SRB_FLAGS_CONCAT_TAIL and the intermediate SRBs have their SRB flags set to the value SRB_FLAGS_CONCAT_DATA.

After the start Ss, in step S1 the process pointers ConcatSrbHead and ConcatSrbTail are set to the value NULL.

Subsequently, a new SRB 50 having the number Srb and containing a command is received.

In step S2, it is determined whether the databus 23 is busy transferring an existing queue. If not, then no analysis of the queue 26 is performed and instead the process proceeds to step S3 in which it is determined whether the queue 26 is empty or contains SRBs to be transferred. If it is determined that the queue 26 is empty, the process proceeds to step S4 in which the new SRB 50 is transferred over the databus 23 and the process pointers ConcatSrbHead and ConcatSrbTail are set to the value NULL. If it is determined that the queue 26 is not empty, the process proceeds to step S5 in which the new SRB 50 is stored in the queue 26, the SRB at the head of the queue 26 is transferred over the databus 23 and the process pointers ConcatSrbHead and ConcatSrbTail are set to the value NULL.

If in step S2 it is determined that the databus 3 is busy transferring an existing queue, then in step S6 the new SRB is stored in the queue 26 and analysis of the queue 26 is performed as follows, proceeding first to step S7.

In step S7, it is determined whether the process pointer ConcatSrbHead has the value NULL. If so, then either there is no preceding SRB in the queue 26 or the preceding SRB in the queue 26, if any, is not a data access command (due to processing described below), so the new SRB cannot be concatenated with preceding SRBs and the process proceeds to step S8.

In step S8, it is determined whether the new SRB 50 specifies a data access command, by determining if its opcode indicates that it is a read, write or verify command. If not, then the process proceeds to step S9 wherein the process pointers ConcatSrbHead and ConcatSrbTail are set to the value NULL. Otherwise, if the new SRB 50 specifies a data access command, then the process proceeds to step S10 wherein the process pointers ConcatSrbHead and ConcatSrbTail are set to the value Srb of the new SRB 50 to indicate that it might form the head of a group of commands to be concatenated.

If in step S7 it is determined whether the process pointer ConcatSrbHead has a value that is not NULL, then there is a preceding SRB in the queue 26 that is a data access command and the method precedes to step S11 wherein it is determined whether the new SRB 50 specifies a data access command. If so, in step S12 it is determined whether the new SRB 50 specifies the same type of data access command as the preceding SRB in the queue 26. If so, in step S13 it is determined whether the new SRB 50 specifies a range of addresses that is contiguous with the preceding SRB in the queue 26. If so, the process proceeds to step S14. Thus steps S11 to S13 together identify whether the new SRB 50 can be concatenated with the previous SRB in the queue 26. If so, in step S14 the process pointer ConcatSrbTail is set to the value Srb of the new SRB 50 to indicate that it does form the tail of a group of commands to be concatenated. Otherwise the process proceeds to step S9 wherein the process pointers ConcatSrbHead and ConcatSrbTail are set to the value NULL.

By repeated cycles of steps S2, S6, S7 and S11 to S14, a group of more than two commands to be concatenated may be built up.

After step S4, S5, S9, S10 or S14, the process proceeds to step S15 in which it is determined if the queue 26 is empty. If not, the process proceeds to step S16 in which the process waits until the databus 23 is not busy before proceeding to step S5 (via step S3) to transfer the SRB at the head of the queue 26 over the databus 23. Otherwise the process proceeds to step S16 in which it is determined if a further new SRB has been received. If so, the process returns to step S2 or else the process reaches the end Se.

The SRB flags are set in steps S10 and S14, as follows.

In step S10, a new group of SRBs identified for concatenation is created so the new SRB 50 has its SRB flag set to SRB_FLAGS_CONCAT_HEAD.

In step S14, the group of SRBs is extended by adding the new SRB 50. Thus, the new SRB 50 has its SRB flag set to SRB_FLAGS_CONCAT_TAIL. If the flag of the previous SRB was set to SRB_FLAGS_CONCAT_TAIL (rather than SRB_FLAGS_CONCAT_HEAD), then the flag of the previous SRB is now set to SRB_FLAGS_CONCAT_DATA. Lastly, the transfer length TX field in the SRB at the head of the group (whose SRB flag is SRB_FLAGS_CONCAT_HEAD) is modified to be the overall length of the commands in the group, that is by being increased by transfer length TX field of the new SRB 50.

In step S9, the SRB flag of the new SRB 50 is set to a value SRB_FLAGS_SINGLE to indicate that the new SRB 50 is not a data access command and is therefore a single non-contatenatable command.

Figure 11:
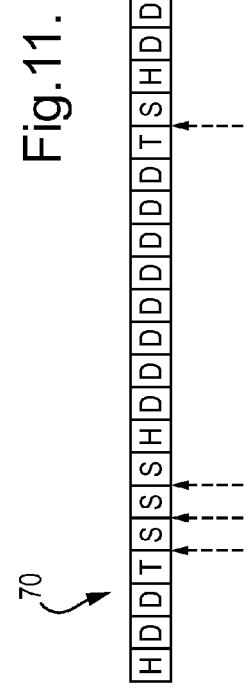
FIG. 11 is a diagram of a pipeline of marked SRB commands.

In this way, the groups of SRBs in the queue 26 are identified for concatenation by the SRB flags. An example of this is shown in FIG. 11 which shows the SRB flags for a queue of SRBs 70, the letters H, D, T and S indicating the SRB flags SRB_FLAGS_CONCAT_HEAD, SRB_FLAGS_CONCAT_TAIL, SRB_FLAGS_CONCAT_DATA and SRB_FLAGS_CONCAT_SINGLE, respectively.

Due to the check performed in step S2, the processing to analyse queued commands takes place while the databus 23 is not busy and head of the queue 26 is stationary waiting for the hardware to become available to accept another command. Thus, the analysis of the queue does not introduce any processing delay.

When the SRB at the head of the queue 26 is transferred over the databus 23 in step S5, in the case that the SRB to be transferred is at the head of a group SRB_FLAGS_CONCAT_HEAD, then in place of transferring each individual command in the group, a concatenated command is transferred. The concatenated command specifies the same type of data access and the overall range of addresses specified by the identified data access commands. As the transfer length TX field in the SRB at the head of the group has been modified in step S14, this is achieved simply by using the start address LBA and the transfer length TX of the head SRB. An alternative is not to modify the transfer length TX field in the SRB at the head of the group in step S14, but instead simply to derive the overall range of addresses at the time of transfer from the SRBs in the group, that is by summing their transfer lengths TX. In the case of a data transfer command, the storage data is extracted from all the commands in the group.

When commands are transferred, a record of the individual commands is maintained in the controller 24, in particular stored in the memory 25, until a response (e.g. a status) is received from the storage device 10. In the case of a concatenated command, the record identifies groups of commands that have been replaced by a concatenated command. This is recorded by storing the same SRB flags as stored in the queue 26 prior to transfer, as described above. The controller determines whether responses are to individual or concatenated commands. In response to receiving a response from an individual command, the controller 24 returns a response to the host apparatus 21 in the normal manner. In response to receiving a response from a concatenated command, the controller 24 returns to the host apparatus 21 separate responses to each of the commands in the group replaced by the concatenated command.

The form of the commands transferred over the databus 23 will now be described for a UAS command pipeline. UAS over USB2 protocol uses four USB requests, being Command IU (CIU), Ready IU (RIU), Data (DAT), and SenseIU (SIU) for a Data Transfer Command, and uses two USB requests CIU, and SIU for a Non Data Transfer Command. CIU identifies the type of the command and passes downstream from the controller 21. RIU passes upstream from the storage device 10 to indicate readiness for data transfer. DAT contains the storage data. SIU passes upstream from the storage device 10 and is a response. Each request is transferred in a packet on the USB databus.

Figure 12:
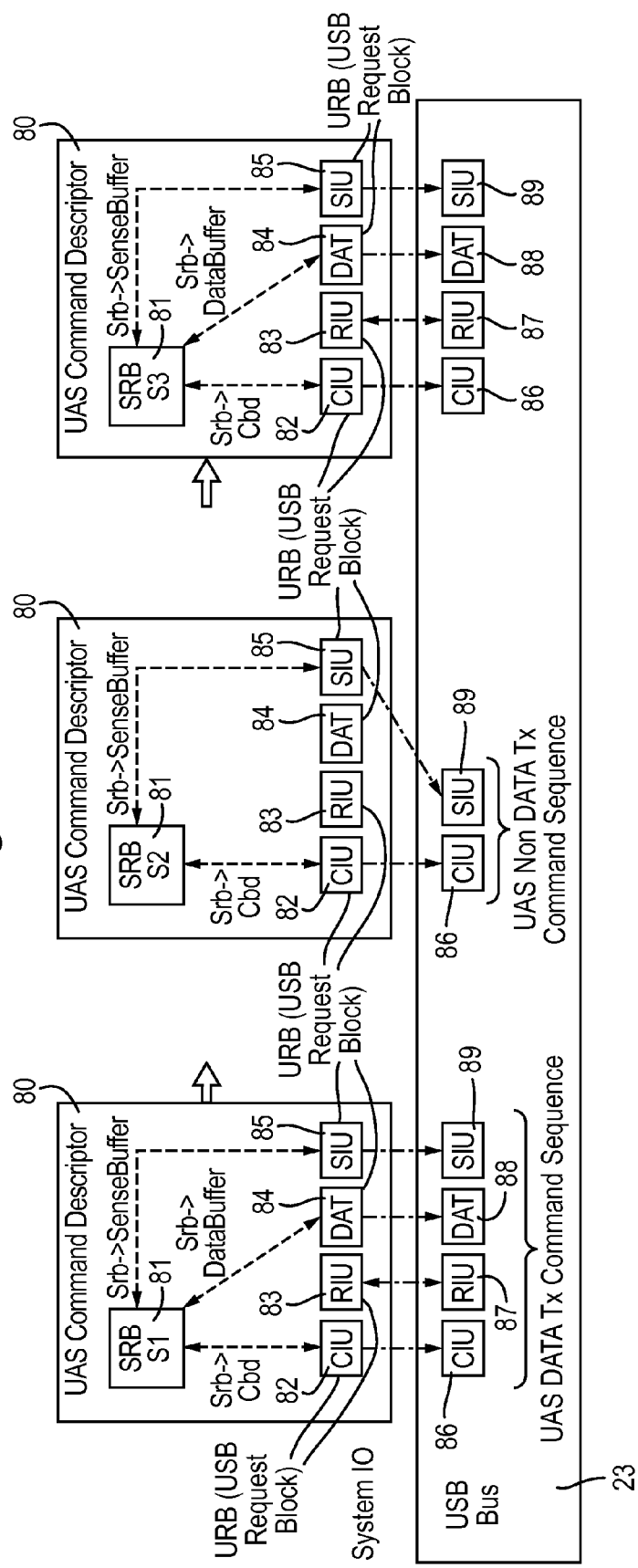
FIG. 12 is a diagram of a UAS driver command pipeline.

For normal transfer of individual commands, the commands take their normal form in accordance with UAS as shown in the example of FIG. 12 which illustrates some private objects UAS_COMMAND_DESCRIPTOR (UCD) 80 that represents the UAS command sequence in respect of SRBs 81. An internal state machine in the UCD 80 converts the SRBs 81 into the USB requests CIU 82, RIU 83, DAT 84 and SIU 85 which are then transferred as respective USB packets CIU 86, RIU 87, DAT 88 and SIU 89 over the databus 23. The UCD 80 checks SRB_FLAGS field, and processes the necessitated UAS protocol sequence. In the case of an individual command as shown in FIG. 12, each SRB 81 is converted into a set of four USB packets CIU 86, RIU 87, DAT 88 and SIU 89 in the case of a data transfer command such as the first and third SRBs 81 or two USB packets CIU 86, and SIU 89 in the case of a non data transfer command such as the second SRB 81.

UAS allows the host driver to send multiple commands (Command Queuing), so that the driver has a limited number of UCD objects 80 as a command pipeline, when all UCD objects 80 are processing commands then the driver starts queuing SRBs into a pending SRB list, otherwise it processes from of the list top to the bottom. When a UCD 80 finishes the required process for the target SRB then it is reused for processing a new SRB which is placed at the top of pending SRB list, otherwise is retired from active UCD pipeline and waits for the new SRB.

Figure 13:
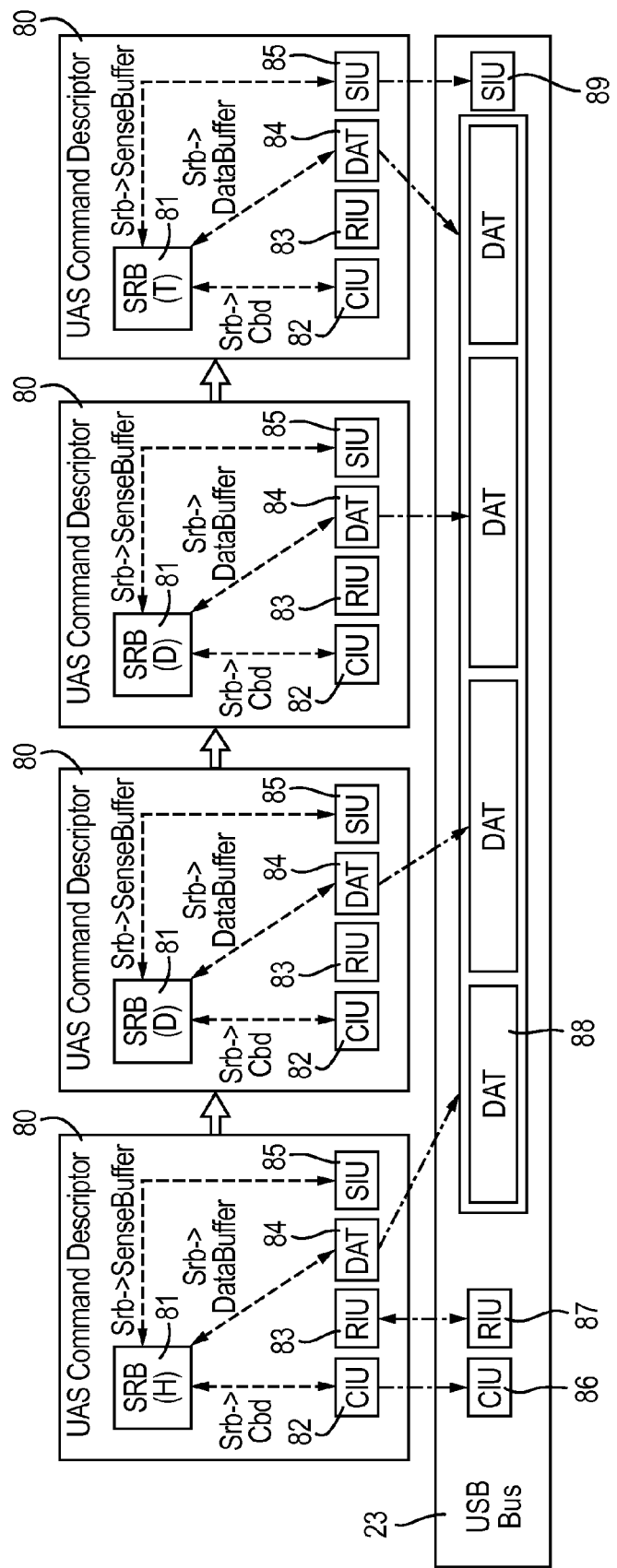
FIG. 13 is a diagram of the UAS driver command pipeline of FIG. 12 executing a concatenated command.

The transfer of concatenated commands is illustrated in FIG. 13 for the example of a group of four SRBs 81 that have been identified for concatenation by their SRB flags as indicated by the letters H, D and T in FIG. 13. In response to the SRB flags, the UCD 80 processing the SRB 81 at the head of the group generates USB requests CIU 82, RIU 83, and DAT 84, the UCD 80 processing the SRB 81 within the group generate USB requests DAT 84 and the UCD 80 processing the SRB 81 at the tail of the group generates USB requests DAT 84 and SIU 85. From this a single set of four USB packets CIU 86, RIU 87, DAT 88 and SIU 89 is generated and transferred on the databus 23. In particular, the USB packets CIU 86, and RIU 87 are generated from the USB requests CIU 82 and RIU 83 of the SRB 81 at the head of the group, the USB packet DAT 88 is generated from the USB requests DAT 84 of all the SRBs 81 in the group, and the USB packet SIU 89 is generated from the USB requests SIU 85 of the SRBs 81 at the tail of the group.

Since the command of the SRB 81 at the head of the group scheduled (as CIU 82) has a transfer length TX of the overall group, almost no additional delay is introduced by a concatenated command. Because the storage device 10 is processing a single large transferred data, the overall status is notified by SIU, so that UCDs 80 that handle the SRBs 81 other than the SRB 81 at the tail of the group can be retired and reused to process another SRB 81 when necessary. When the UCD 80 for handling the SRB 81 at the tail of the group receives the SIU packet 89 from the storage device 10 as a notification of a group command, then it completes all the SRBs 81 in the group, the SRB 81 at the tail having a pointer to the SRB 81 at the head such that all the SRBs 81 remain linked.

Figure 14:
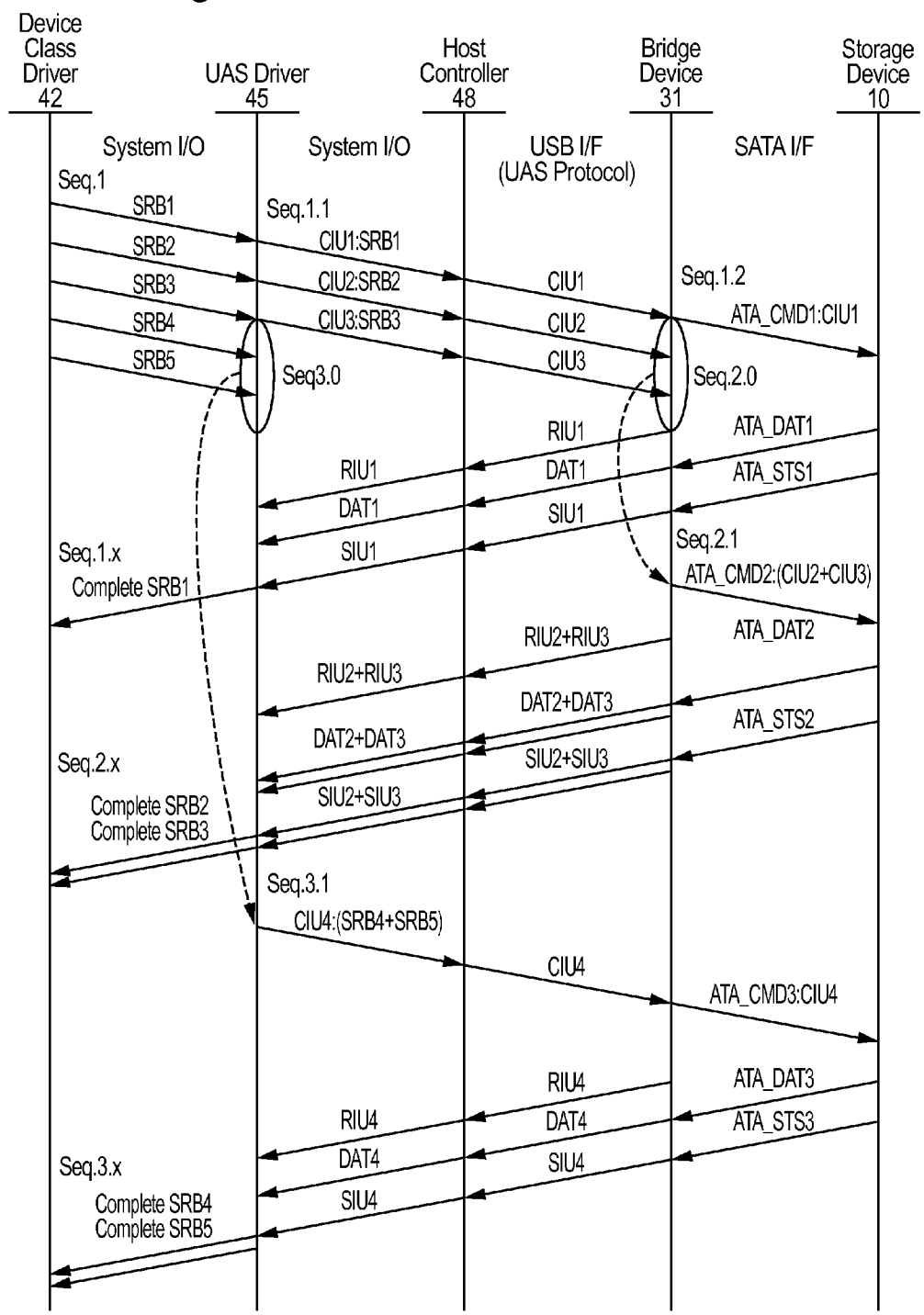
FIG. 14 is a sequence diagram of data transfers over a system including a host apparatus connected to a data storage device via two databuses and an intermediate bridge device.

FIG. 14 shows a sequence diagram illustrating the timing of the transfer of requests over the system of FIG. 2 in the case that the upstream databus 23 is a USB databus operating under the UAS protocol and the downstream databus 33 is a SATA databus. In FIG. 14, the Device Class Driver 42, Host Hub Driver 45, Host Controller Driver 48, bridge device 31 and storage device 10 are shown by vertical lines and requests are shown by arrows.

Seq. 1 illustrates the normal UAS protocol.

Seq. 2 illustrates command concatenation by the bridge device 31. This shows how two commands received at the bridge device 31 are concatenated into a single command sent to the storage device 10, but with the bridge device 31 returning separate responses to the host apparatus 21.

Seq. 3 illustrates command concatenation by the controller 24 of the host apparatus 21. This shows how two commands received at the controller 24 are concatenated into a single command sent to bridge device 34 and hence to the storage device 10, but with the controller 24 returning separate responses to the host apparatus 21.

The above examples relate to systems in which commands and storage data are transferred over a databus, 3, 23 or 33, but this is not essential. The technique may also be applied to the transfer of commands and storage data within a system that does not include a databus. An example of such a system may be where a storage device is being emulated using a virtual device driver which reads and writes data from/to an alternative storage medium, such as random access memory (RAM). In this case, the application program and operating system issue data transfer commands to the virtual storage device in exactly the same manner as a physical storage device connected by a databus. The virtual device driver must queue these commands for execution, but instead of transferring these commands over a databus to the storage device, the commands are converted into commands or instructions for reading and writing the alternative storage medium.

While the data access protocol and access times for this alternative storage medium may differ greatly from access to a data storage device via a databus, it is still the case that the commands will, in general, be executed serially in time. There will also, in general, be a processing overhead for each command converted. It follows therefore, that by implementing this technique a benefit is achieved by reducing the processing overheads of a group of identified data access commands into a single processing overhead of a concatenated data access command, thereby increasing the overall data transfer rate.

In general, this technique can be used anywhere where data access commands are being queued for processing and that downstream of the queue, there will be a cost in time associated with the processing of each command and that this cost can be reduced and the data throughput improved by using concatenated data access commands in place of a group of identified data access commands.

The features of the dependent claims may be used together in any combination.

The invention claimed is:

1. A controller for controlling transfer of commands and storage data to a Universal Serial Bus (USB)-attached data storage device via the USB Attached SCSI (UAS) protocol, wherein the controller is arranged to transfer commands and storage data with the USB-attached data storage device over a USB databus via UAS with additional concatenation of commands, the commands including data access commands specifying respective types of data access and a range of addresses, the controller comprising a memory arranged to store a queue of commands prior to the commands being transferred, each command contained in respective SCSI request blocks (SRBs), and the controller is further arranged to process the SRBs and identify a plurality of data access commands in the queue for the transfer of data that specify the same type of data access and contiguous, but non-identical, ranges of addresses and, in response thereto, to transfer a concatenated data access command in place of the identified plurality of data access commands, the concatenated data access command specifying the same type of data access and the overall range of addresses specified by the identified plurality of data access commands, wherein the concatenation is a single command that, when executed, performs identically as if the identified data access commands were executed individually.

2. A controller according to claim 1, wherein the controller is arranged to store a record of the identified data access commands that are replaced by a concatenated data access command and, in response to receiving a response to a concatenated data access command from a data storage device, to return separate responses to each of the identified data access command indicated in the record.

3. A controller according to claim 1, wherein the data access commands specify respective types of data access including reading, writing and verifying of storage data.

4. A controller according to claim 1, wherein the data access commands include a start address of data to access and a length that specify said range of addresses of data to access.

5. A controller according to claim 1, wherein the controller is arranged to control the transfer of commands and storage data serially in time and the identifying of access commands is performed while the databus is busy with the transfer of data.

6. A controller according to claim 5, wherein the controller is arranged to control the transfer of commands and storage data in time-serial frames with commands and storage data being transferred in different frames.

7. A controller according to claim 1, being a controller for controlling the transfer of commands that originate form a host apparatus and storage data over a databus.

8. A controller according to claim 7, wherein the controller is arranged to perform said identifying of data access commands while the databus is busy with the transfer of data thereover.

9. A host apparatus comprising a controller according to claim 7, the controller being arranged to receive the data access commands from the operating system of the host apparatus.

10. A bridge device for bridging an upstream databus for connection to host apparatus to a downstream databus for connection to a data storage device, the bridge device comprising a controller according to claim 1 for controlling transfer of commands and storage data over the downstream databus, the controller being arranged to receive the data access commands from the host apparatus over the upstream databus.

11. A method of controlling transfer of commands and storage data to a Universal Serial Bus (USB)-attached data storage device via the USB Attached SCSI (UAS) protocol, the method comprising:

transferring commands and storage data over a USB databus with the USB-attached data storage device via UAS with additional concatenation of commands, the commands including data access commands specifying respective types of data access and a range of addresses including:

storing a queue of commands prior to the commands being transferred over the databus each command contained in respective SCSI request blocks (SRBs); and processing the SRBs and identifying a plurality of data access commands for the transfer of data in the queue that specify the same type of data access and contiguous, but non-identical, ranges of addresses and, in response thereto, transferring a concatenated data access command in place of the identified data access commands, the concatenated data access command specifying the same type of data access and the overall range of addresses of the ranges specified by the identified plurality of data access commands, wherein the concatenation is a single command that, when executed, performs identically as if the identified plurality of data access commands were executed individually.

12. A method according to claim 11, further comprising storing a record of the identified data access commands that are replaced by a concatenated data access command and, in response to receiving a response to a concatenated data access command from a data storage device, returning separate responses to each of the identified data access commands indicated in the record.

13. A method according to claim 11, wherein the data access commands specify respective types of data access including reading, writing and verifying of storage data.

14. A method according to claim 11, wherein the data access commands include a start address of data to access and a length that specify said range of addresses of data to access.

15. A method according to claim 11, wherein the commands and storage data are transferred serially in time.

16. A method according to claim 15, wherein the commands and storage data are transferred over the databus in time-serial frames, commands and storage data being transferred in different frames.

17. A method according to claim 11, being a method of controlling transfer of commands and storage data over a databus.

18. A method according to claim 17, wherein the step of identifying of data access commands is performed while the databus is busy with the transfer of data thereover.

* * * * *